United States Patent [19]

Gohara et al.

[11] Patent Number: 4,507,523
[45] Date of Patent: Mar. 26, 1985

[54] POSITION DETERMINATION APPARATUS

[75] Inventors: Yoshihiro Gohara, Osaka; Masashi Kanno; Ichiro Yamashita, both of Katano, all of Japan

[73] Assignee: Matsushita Electric Industrial Co., Ltd., Osaka, Japan

[21] Appl. No.: 496,493

[22] Filed: May 17, 1983

[30] Foreign Application Priority Data

| May 19, 1982 | [JP] | Japan | 57-85159 |
| Oct. 18, 1982 | [JP] | Japan | 57-183150 |
| Oct. 19, 1982 | [JP] | Japan | 57-183954 |
| Mar. 8, 1983 | [JP] | Japan | 58-37643 |
| Mar. 15, 1983 | [JP] | Japan | 58-43508 |

[51] Int. Cl.³ .......................................... G08C 21/00
[52] U.S. Cl. .................................................. 178/19
[58] Field of Search ................. 178/18, 19; 364/520

Primary Examiner—Stafford D. Schreyer
Attorney, Agent, or Firm—Wenderoth, Lind & Ponack

[57] ABSTRACT

An electromagnetic-induction-type position determination apparatus or digitizer for inputting or digitizing hand-written characters and graphic equipment to electronic equipment is arranged so as to have a reduced number of conductors installed on its interface plate and has a reduced number of complicated control circuits. The apparatus includes an interface plate having conductors installed in the form of a matrix and a control system for supplying two currents to two conductors in the same direction. A pick-up is moveably positioned on the interface plate for picking up two induced voltages induced by magnetic fields generated by the two currents flowing through the two conductors and a detector and processor are arranged to detect a predetermined relationship between the two induced voltages and to derive digital coordinate data based on the detected predetermined relationship.

10 Claims, 13 Drawing Figures

POSITION DETERMINATION APPARATUS

BACKGROUND OF THE INVENTION

1. Field of the Invention

This invention relates to an electromagnetic-induction-type position determination apparatus or digitizer which can be effectively used for inputting or digitizing hand-written characters and graphic figures to electronic equipments such as computers.

2. Description of the Prior Art

Recently, there has been increasing demands for less expensive position determination apparatus which easily enable the inputs of hand-written characters and graphic figures, as intelligent terminals for computers.

The electromagnetic-induction-type position determination apparatus have been known as one type of the position determination apparatus. This type of apparatus are widely used because they have such advantages that, owing to the spatial coupling of a pickup means such as a writing pen and a cursor and an interface plate through spaces, tracing-inputting of manuscripts can be executed on the interface plate and they keep accurate operations and high reliability even if the surface of the interface plate is dirty.

Some of the conventional electromagnetic-induction-type position determination apparatus were introduced in the NIKKEI ELECTRONICS, issued on Oct. 2, 1978 pages 118 through 131. However, the conventional electro-magnetic-induction-type position determination apparatus require many fine conductive wires to be minutely installed on their input boards in order to obtain high resolution. Accordingly, they inherently have such disadvantages that handling a tremendously large quantity of outgoing lines is troublesome, and that wiring the conductors precisely is difficult. These disadvantages become more serious to the large size interface plates.

Although such position determination apparatus are available that has less number of outgoing lines by using coil-shaped conductors on their input boards without deteriorating their resolution in order to solve the above-mentioned disadvantages, they have other problems that their control circuits and detection circuits become more complicated and more expensive.

SUMMARY OF THE INVENTION

An object of the present invention is to provide a position determination apparatus which has considerably reduced number of conductors installed onto an interface plate, and does not require complicated control circuits for obtaining high resolution at a low cost.

This object of the present invention can be realized by a position determination apparatus comprising: an interface plate having plural conductors installed thereon in the form of a matrix with specified spaces in X and Y directions; a control means for supplying two currents to two conductors in the same direction out of said plural conductors, which comprises: a current source for producing a current; a selection means coupled to said current source for selecting said two conductors in the same direction out of said plural conductors and supplying said two currents to the selected two conductors; and a scanning means for controlling said current source and for giving address data for selecting said two conductors to said selection means, said two currents applied to said two conductors being so controlled as to be in a predetermined relation to each other; a pickup means movably positioned on said interface plate for picking up induced voltages induced by magnetic fields generated by said two currents flowing through said selected two conductors; a detection means coupled to said pickup means for detecting a predetermined relation between said induced voltages; and a deriving means coupled to said control means and said detecting means for deriving current data and said address data when said detection means detects said predetermined relation between said induced voltages, thereby to obtain a coordinate data corresponding to the position of said pickup means on said interface plate.

The above and other objects and features of this invention are to be made clear by the following detailed description together with the accompanying drawings.

DESCRIPTION OF THE PREFERRED EMBODIMENTS

The preferred embodiments of this invention are to be concretely described hereafter on the basis of the drawings.

Figure 1A:
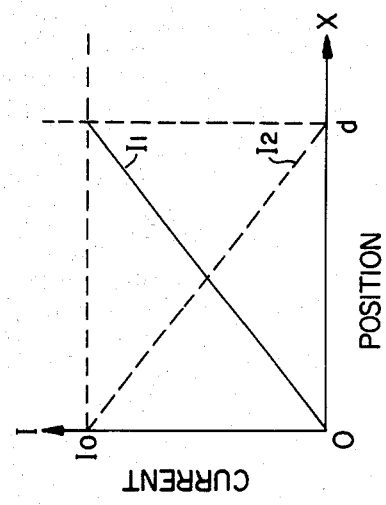
FIG. 1(A) is a schematic diagram to show the position detection principle of the position determination apparatus of this invention.

In FIG. 1(A), 1, 1 are conductors installed in parallel with each other, and 2 is a detection coil or pickup coil placed on the same plane as the conductors 1. This is, for example, mounted to the tip of an input pen. As shown in FIG. 1(A), when flowing a current $I_1$ to one of the conductors and that $I_2$ to the other conductor, magnetic fields generated between the both conductors are expressed as below, assuming that the magnetic field caused by the current $I_1$ is $H_1$, and that caused by the current $I_2$ is $H_2$:

$$H_1 = \frac{I_1}{2\pi x} \quad (1)$$

$$H_2 = \frac{I_2}{2\pi(d-x)} \quad (2)$$

("$d$" is a distance between the two conductors.)

Figure 1B:
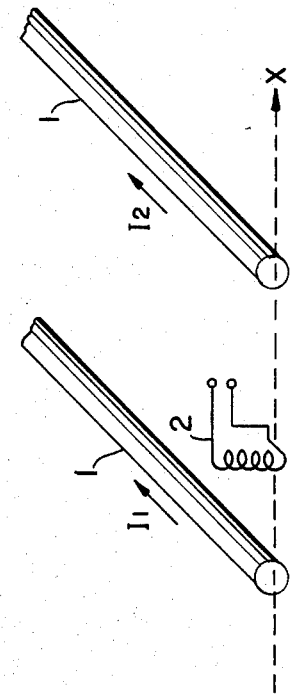
FIG. 1(B) is a graph to show the distribution of the intensities of magnetic fields.

If these magnetic fields are shown by a graph, their intensities are distributed as in FIG. 1(B). Next, when placing the detection coil 2 at a position where $x=xp$ as shown in FIG. 1, the voltages caused by the detection coil 2 are expressed as below, assuming an induced voltage by $H_1$ and $V_1$ and that by $H_2$ as $V_2$:

$$V_1 = K \cdot H_1 = \frac{K \cdot I_1}{2\pi xp} \quad (3)$$

$$V_2 = K \cdot H_2 = \frac{K \cdot I_2}{2\pi(d-xp)} \quad (4)$$

("$K$" is a constant)

Accordingly, if the position "xp" of the detection coil is obtained out of the formulas (3) and (4), it is expressed as in the following formula:

$$xp = \frac{d \cdot \frac{I_1}{I_2}}{\frac{V_1}{V_2} + \frac{I_1}{I_2}} \quad (5)$$

Assuming the following formulas:

$$\frac{V_1}{V_2} = \alpha \text{ ("α" is constant)} \quad (6)$$

$$I_1 + \alpha I_2 = I_0 \text{ ("$I_0$" is constant)} \quad (7)$$

The position "xp" of the detection coil 2 is expressed as follows:

$$xp = \frac{d}{I_0} \cdot I_1 \quad (8)$$

That is, the position "xp" of the detection coil 2 can be obtained by checking a value of $I_1$ when a ratio of the induced voltages $V_1$ and $V_2$, which are induced at the detection coil 2 by the currents $I_1$ and $I_2$, comes to $\alpha$. Incidentally, the conditional formulas (6) and (7) can be effected more easily if $\alpha=1$. Therefore, the above-mentioned conditional formulas are expressed as follows:

$$V_1/V_2 = 1 \quad (9)$$

$$I_1 + I_2 = I_0 \text{ ($I_0$: constant)} \quad (10)$$

Figure 2:
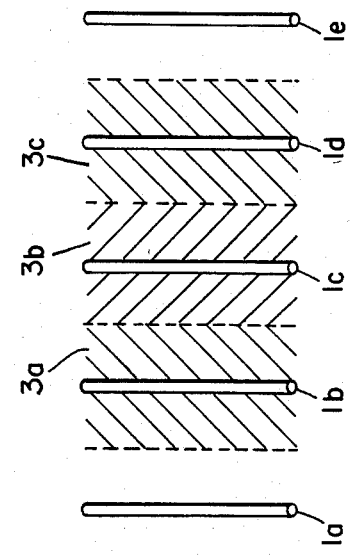
FIG. 2 is a graph to show the relation between the current flowing the conductors and a coordinate position to be detected.

That is, the position "xp" of the detection coil 2 can be obtained out of the value of $I_1$ when the ratio of the values of the induced voltages $V_1$ and $V_2$ induced at the detection coil 2 becomes 1, changing the currents $I_1$ and $I_2$ of the two conductors by differential. This relation is shown in FIG. 2.

However, when the detection coil 2 is placed just above the conductors 1, the induced voltages are theoretically not generated to the detection coil 2 from the above-mentioned conductors 1. Consequently, selecting two of every other conductors makes it possible to avoid this non-detection area.

Figure 3:
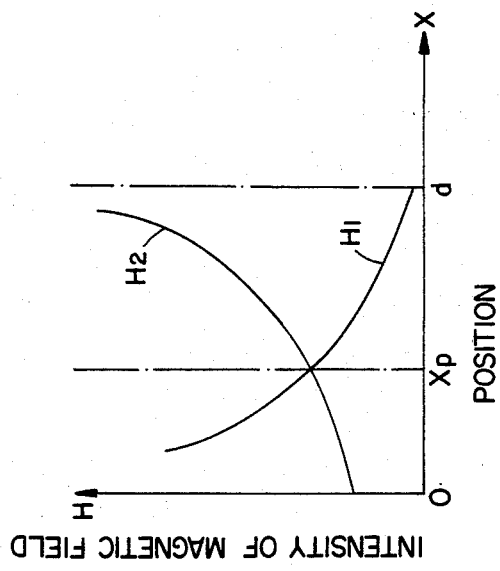
FIG. 3 is a schematic diagram to show the relation between the conductors installed on an interface plate and an effective interpolation area.
Figure 4:
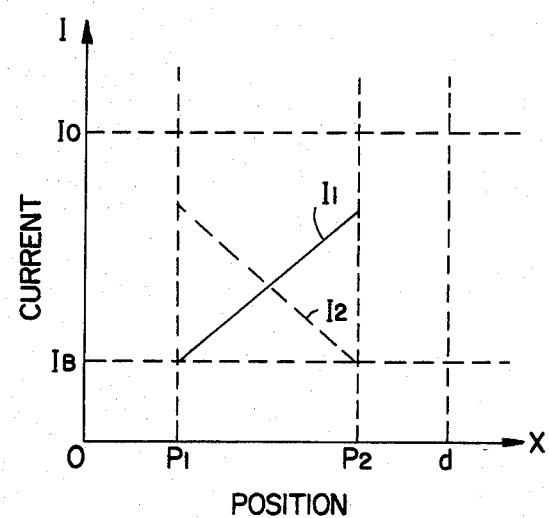
FIG. 4 is a graph to show the relation between the effective interpolation area and currents flowing the conductors.

In other words, in FIG. 3, when conductors 1a and 1c are selected, if the effective interpolation area of the above-mentioned conductors is 3a, similarly 3b for conductors 1b and 1d, and 3c for conductors 1c and 1e, positions on the input surface can be continuously detected. In order to make the effective interpolation area as shown in FIG. 3, it is successfully arranged that the driving formula of the currents $I_1$ and $I_2$ to the selected two conductors are changed to the range shown in FIG. 4 from that of FIG. 2. Generally, it is preferable for output coordinate values of the position determination apparatus to be expressed by digital codes. As currents are representative in proportion to coordinate values as in this embodiment, it is possible directly to read out them as digital coordinate values by generating the currents by means of Digital/Analog conversion (to be referred to as D/A conversion hereafter) controlled by digital codes. In FIG. 4, the coordinate values of positions $P_1$ and $P_2$ are desired to come to "0" and full scale, respectively. These values can be easily realized by superposing a bias current with a current value of $I_B$ shown in FIG. 4 on a current generated by the above-mentioned D/A conversion.

Also, the induced voltages induced at the above-mentioned detection coil by the currents $I_1$ and $I_2$ flowing in the two conductors selected above can be easily detected independently by supplying $I_1$ and $I_2$ to the two conductors by turns on the basis of time division multiplexing. Furthermore, when generating the above-mentioned currents $I_1$ and $I_2$ by using the D/A conversion, time divided differential currents can be easily generated by alternately converting a digital code corresponding to the value of $I_1$ and the complement of this digital code to analog codes on the basis of the time division multiplexing.

Figure 5:
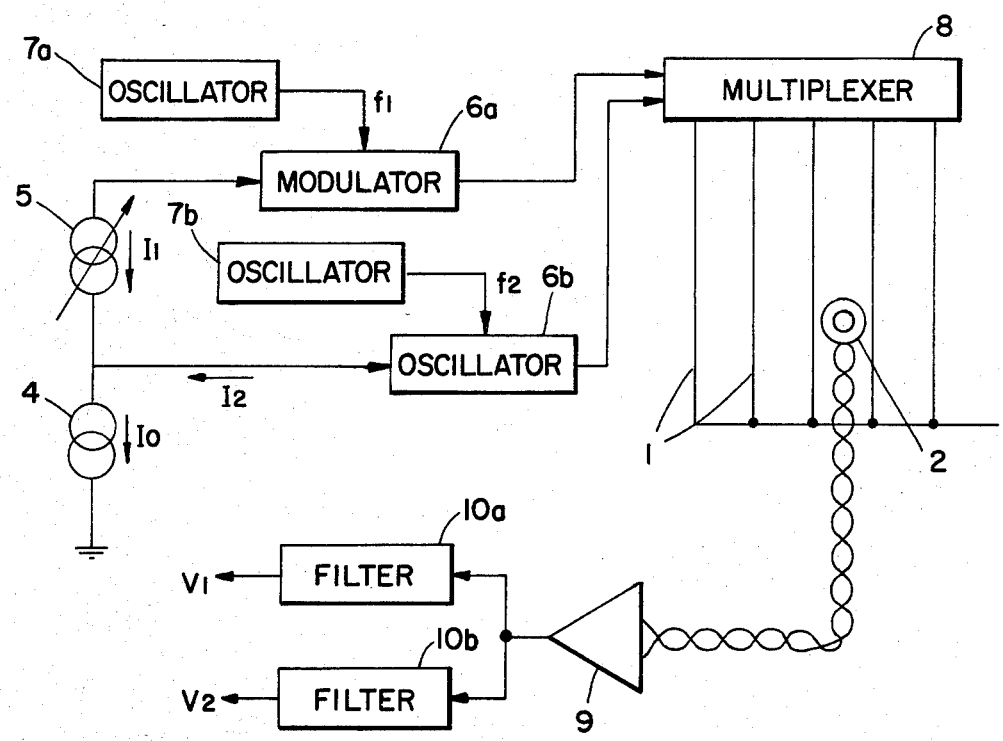
FIG. 5 is a block diagram to show an example method which separates induced voltages $V_1$ and $V_2$ by using different frequencies.

When the above-mentioned time division method is not used, each of the induced voltages induced at the detection coil can be independently detected by introducing the currents $I_1$ and $I_2$ with different frequencies to the two conductors at the same time. FIG. 5 is a block diagram which shows an embodiment of the above-mentioned method.

A constant current source 4 and variable current source 5 generate the differential currents $I_1$ and $I_2$ which are flown to the conductors 1 through a multiplexer 8 by modulators 6a and 6b with different frequencies $f_1$ and $f_2$ respectively provided. On the other hand, the induced voltages induced at the detection coil 2 are amplified by an amplifier 9 and respectively separated by filters 10a and 10b which have the pass-band frequencies of $f_1$ and $f_2$ respectively. 7a and 7b are oscillators to supply carrier waves of the frequencies $f_1$ and $f_2$ to the above-mentioned modulators 6a and 6b.

Next, when the ratio of the values of the induced voltage $V_1$ and $V_2$ comes to 1, a value of $V_1$ and $V_2$ is expressed as "$V_o$" as follows out of the formulas (3), (4) and (8):

$$V_o = \frac{K \cdot I_o}{2\pi d} \quad (11)$$

Next, when placing the detection coil 2 at a position "xp'" shown in FIG. 6, the induced voltages $V_1$ and $V_2$ induced at the detection coil 2 are expressed as follows out of the formulas (3) and (4):

$$V_1 = \frac{K \cdot I_1}{2\pi xp'} \quad (12)$$

-continued $$V_2 = \frac{K \cdot I_2}{2\pi|(d - xp')|} \quad (13)$$

Figure 6:
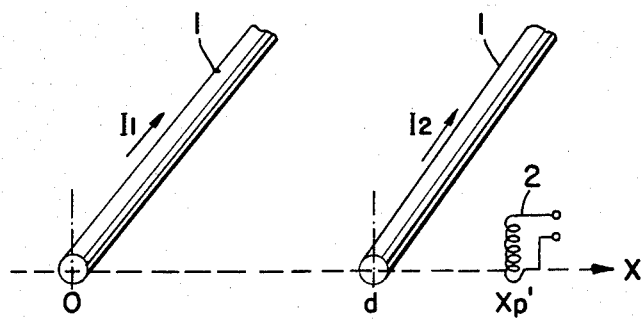
FIG. 6 is a schematic diagram to show the positional relation between the selected two conductors and detection coil.

As $xp' \geq d$ is clear in FIG. 6, the conductor currents $I_1$ and $I_2$ are $I_1 \leq I_o$ and $I_2 \geq I_o$ out of the conditions. Accordingly, the following formula can be obtained out of the formulas (11) and (12):

$$V_o \geq V_1 \quad (14)$$

When the detection coil 2 is placed at a position of $xp'' = -xp'$, the following formula can be similarly obtained out of the formulas (11) and (13):

$$V_o \geq V_2 \quad (15)$$

That is, when the detection coil is not placed between the two conductors through which the currents are flowing, either the formula (14) or (15) is at least effected. Accordingly, whether or not the detection coil 2 exists between the two conductors where the currents are flowing can be judged by comparing the values of the two induced voltages induced at the detection coil 2 with a specified threshold value.

Also, the following formula can be obtained out of the above-mentioned formulas (3), (4) and (8):

$$V_1 + V_2 = \frac{KI_o}{\pi d} \quad (16)$$

Figure 7:
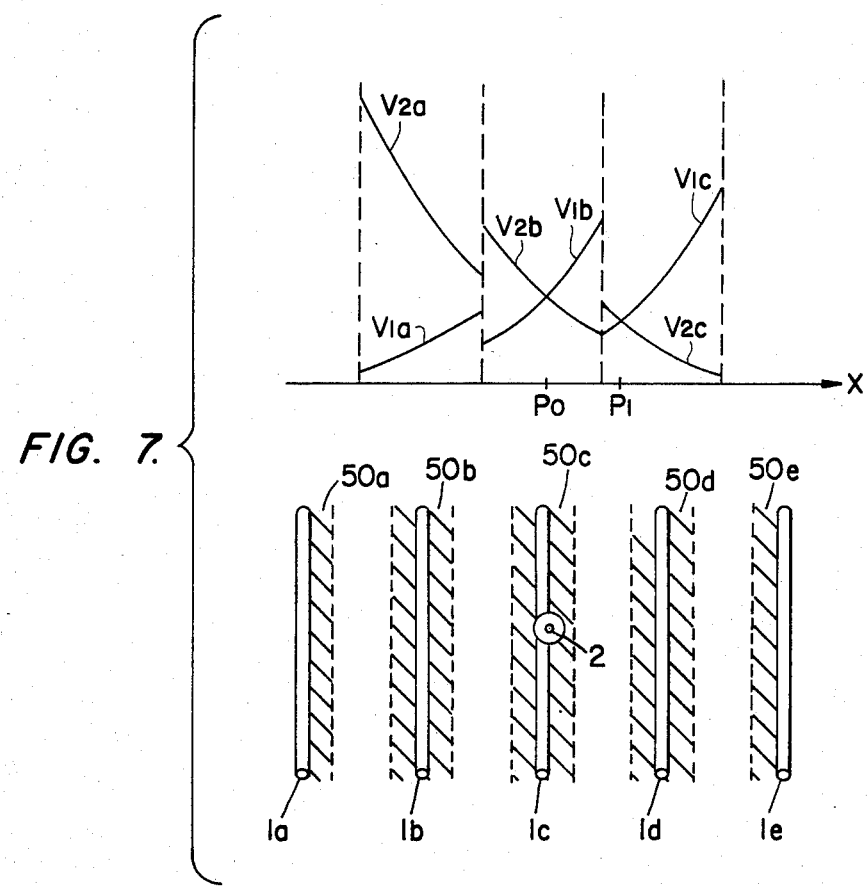
FIG. 7 is a diagram to show the position of the detection coil with respect to each conductor and the induced voltages induced at the detection coil.

In short, the formula (16) shows that the sum of $V_1$ and $V_2$ is always kept constant, when the detection coil exists between the above-mentioned two conductors and the ratio of the induced voltages $V_1$ and $V_2$ induced at the detection coil comes to a specified value which is 1 in this case. When the detection coil exists in another area, the sum of $V_1$ and $V_2$ does not reach the voltage value expressed in formula (16). Consequently, only the correct position of the detection coil can be known by obtaining the sum of $V_1$ and $V_2$ comparing it with the specified threshold value. In FIG. 7, the conductors are labelled by 1a, 1b, 1c, 1d and 1e. Two conductors are respectively selected in the pair of 1a and 1c, 1b and 1d, and 1c and 1e with the detection coil placed at a point of $P_o$, and the induced voltages $V_1$ and $V_2$ induced at the detection coil at the time are shown. Although the values of $V_{1b}$ and $V_{2b}$ coincide with each other at the point $P_o$ due to the principle of this invention, the values of $V_{1c}$ and $V_{2c}$ also coincide with each other at a point of $P_1$. This is because the value of the induced voltage $V_{1c}$ due to the current flowing a conductor 1c decreases with the detection coil placed almost just above the conductor 1c. In FIG. 7, assuming that the induced voltage coincided at the points $P_o$ and $P_1$ are $V_{po}$ and $V_{p1}$, the following formula is effected in ordinary cases:

$$V_{po} > V_{p1} \quad (17)$$

Accordingly, the correct position can be actually judged by providing a specified threshold value. However, when considering the effects of the height and tilt angle of the detection coil with respect to the input surface, a secure judging method is required because the values of $V_{po}$ and $V_{p1}$ may change. The situation in FIG. 7 occurs only when the detection coil exists near the conductors. Therefore, the correct position of the detection coil can be judged by checking whether or not the obtained positional coordinates of the detection coil exist within oblique areas such as 50a, 50b, 50c, 50d and 50e in FIG. 7 when plural coincidences of the induced voltages are detected.

Figure 8:
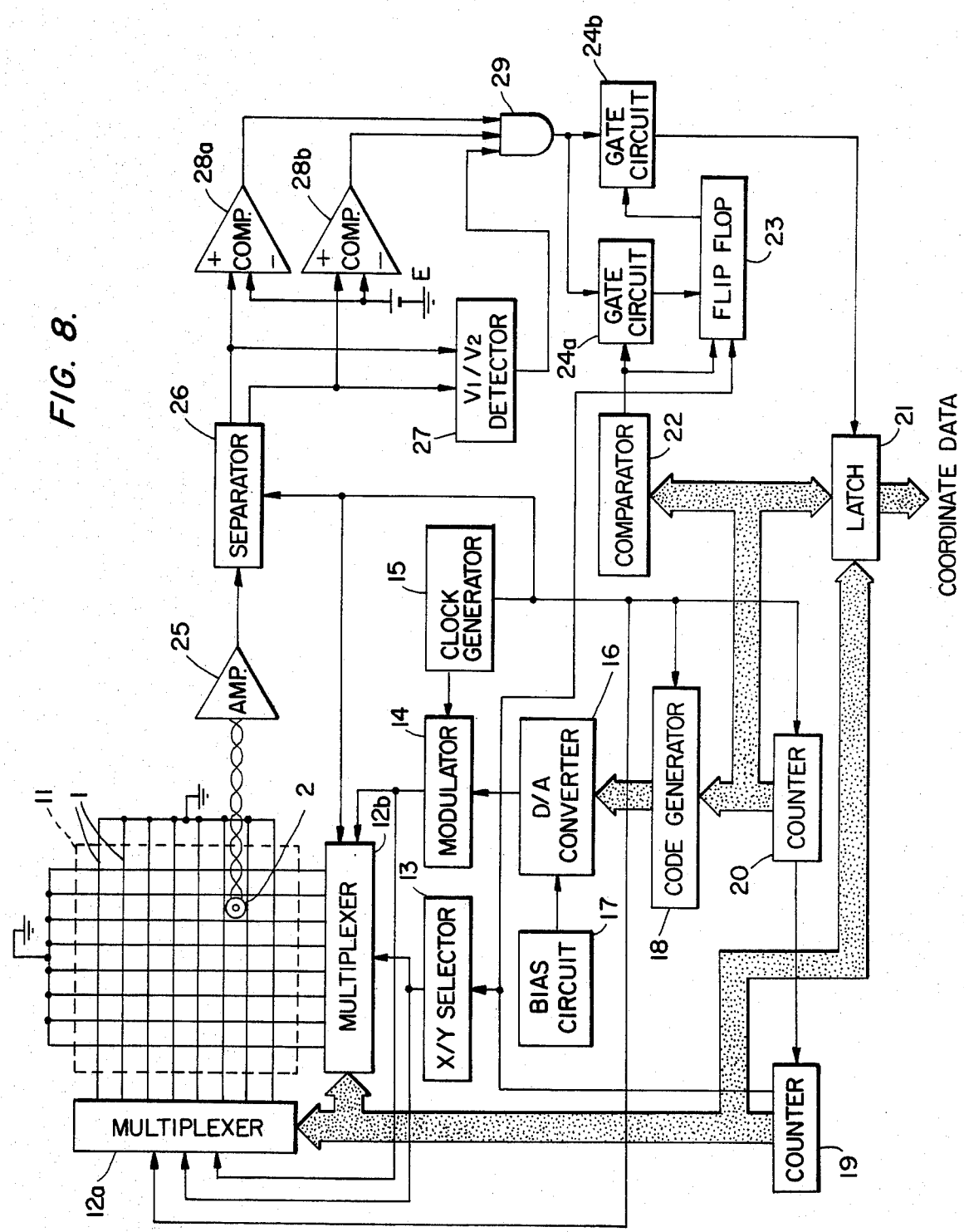
FIG. 8 is a block diagram to show an embodiment of the position determination apparatus of this invention.

FIG. 8 is a block diagram which shows a whole construction of an embodiment of the position determination apparatus of the invention. In FIG. 8, 11 is an interface plate with conductors installed in the form of a matrix, 12a and 12b are multiplexers which select the conductors in accordance with the output codes of a counter 19, 13 is a X/Y selector which selects the multiplexers in the X and Y directions, a part 14 is a modulator which converts the output current of a D/A converter 16 to a high frequency (R.F.) current, 17 is a bias circuit which provides the D/A converter 16 with a specified bias current, 15 is a clock generator which generates timing pulses, 18 is a code generator which generates complement codes alternately on the time division basis from the output codes of a counter 20, 21 is a latch circuit which holds the output codes of the counters 19 and 20 in accordance with the signals of a gate circuit 24b, 25 is an amplifier which amplifies the induced voltages induced at the detection coil 2, 26 is a separator which separates the induced voltages $V_1$ and $V_2$ alternately detected on the time division basis, 27 is a $V_1/V_2$ detector which detects the ratio of the separated induced voltages $V_1$ and $V_2$, 28a and 28b are comparators which compare the above-mentioned $V_1$ and $V_2$ with a specified threshold voltage E, 22 is a comparator which compares the output data of the counter 20 with a specified value and controls a flip-flop 23 and gate circuit 24a, and 24b is a gate circuit which controls the output signal of an AND circuit 29 in accordance with the outputs of the flip-flop 23.

Operations are described hereafter on the embodiment of this position determination apparatus which has the above-mentioned construction. First, the conductors 1 are selected by the multiplexer 12a or 12b in accordance with the output codes of the counter 19. The time division multiplexed differential current is generated by the D/A converter 16 from the output codes of code generator 18 in accordance with the output codes of the counter 20 and is converted to the R.F. current by the modulator 14, and then, is supplied to the conductors 1 through the multiplexer 12a or 12b. When the counter 20 fully counts, a carry signal is inputted to the counter 19, which counts up, and the next conductors are selected. When the counter 19 fully counts, the carry signal is inputted to the X/Y selector 13, which changes over the multiplexer 12a and 12b for the selection of the X and Y directions. On the other hand, the induced voltage induced at the detection coil 2 from the above-mentioned conductors 1 is amplified by the amplifier 25 and is separated into $V_1$ and $V_2$ in accordance with time division timing.

Next, the $V_1/V_2$ detector 27 detects whether or not the ratio of $V_1$ and $V_2$ is 1. Simultaneously the above-mentioned voltages $V_1$ and $V_2$ are compared with the threshold value voltage E by the comparators 28a and 28b. When all output logics of the $V_1/V_2$ detector 27 and comparators 28a and 28b are "1", the output logic of the AND circuit 29 comes to "1". The output codes of the counter 19 and 20 at this time are to be detected as coordinate values. However, in the situation in FIG. 7, the output logic of the AND circuit 29 may come to "1" not only at the point $P_o$ but also at the point $P_1$.

Figure 9:
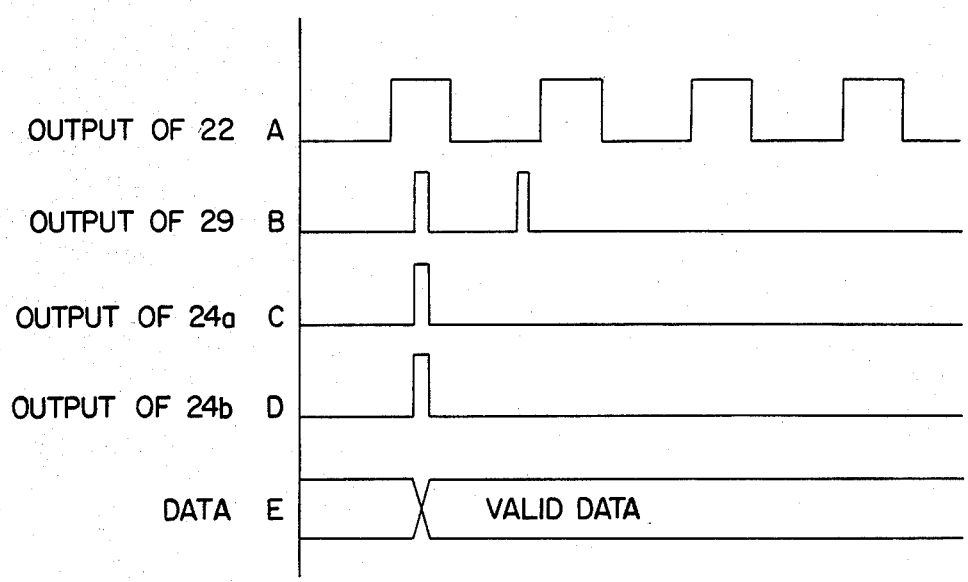
FIGS. 9 through 11 are timing charts to show circuit performances judging whether or not the detected coordinate values are correct.
Figure 10:
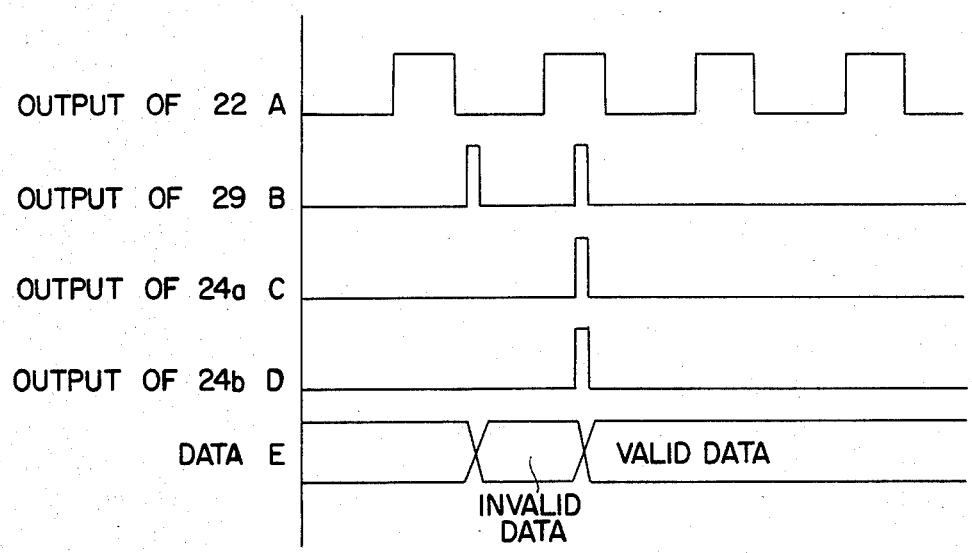
Figure 11:
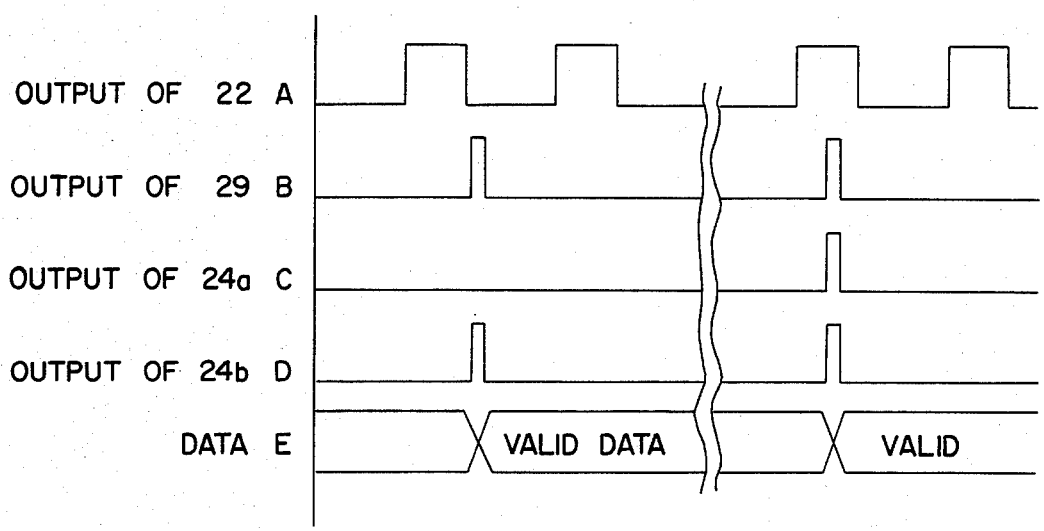

The signal process in this case is described as follows, using the timing chart in FIG. 9. In FIG. 9, "A" is the output signal of the comparator 22, which is a comparison of the output code of the counter 20 and the code in a specified range. "B" is the output signal of the AND circuit 29, which comes to "1" at two places. "C" is the output signal of the gate circuit 24a. The fall of this signal triggers the flip-flop 23, whose output logic comes to "0", and the gate circuit 24b is closed, and then the signal does not pass thereafter. Accordingly, the output signal of the gate circuit 24b turns to be as "D". Since this signal makes the latch circuit 21 temporarily memorize the output codes of the counter 19 and 20, only the correct data of the output signal of the latch 21 is outputted as "E". As the above-mentioned flip-flop 23 is reset by the carry signal of the counter 19, the above-mentioned performance can be repeated again. Cases other than shown in FIG. 9 can be referred to the timing charts in FIG. 10 and FIG. 11. As it is clear in FIGS. 9 through 11, if the output of the latch 21 is read with the output timing of the carry signal of the counter 19, the correct data can be always obtained.

Figure 12:
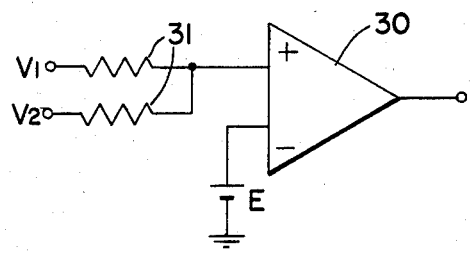
FIG. 12 is a circuit diagram to show an embodiment which compares a detected induced voltage and a threshold value.

Instead of comparing each of the voltages $V_1$ and $V_2$ with the threshold value voltage, it has been already stated that the sum of $V_1$ and $V_2$ can be compared with the threshold value. This case can be easily realized by producing the sum of $V_1$ and $V_2$ with a resistance 31 and comparing it with the threshold value voltage E with a comparator 30 as shown in FIG. 12.

As it is clear in the above-mentioned description, in spite of the fact that the conductors installed on the interface plate are spaced out more widely to considerably reduce the number of the conductors, this invention enables the realization of a position determination apparatus with high resolution at a low cost because the interpolation among each conductor can be made by very simple circuit construction. Furthermore, the size of its interface plate depends only on the number of the installed conductors and the number of bits of the counter 19. Then change of the size of the interface plate can be easily made and does not affect coordinate resolution. In addition, as the coordinate resolution is determined by the number of bits of the counter 20, the coordinate resolution can be easily made twice by only increasing the number of bits of the counter 20 and that of the D/A converter by 1 bit each.

Also, if the conductors installed on the interface plate are made finer and a transparent material is used for the interface plate, a light-transmission-type position determination apparatus can be easily realized to be more widely used.

The above-mentioned embodiments are provided for the better understanding of this invention. It goes without saying that they may vary in many ways without exceeding the scope of this invention.

What is claimed is:

1. A position determination apparatus comprising:
   an interface plate having plural conductors installed thereon in the form of a matrix with specified spaces in X and Y directions;
   a control means for supplying two currents to two conductors in the same direction out of said plural conductors, which comprises: a current source for producing a current; a selection means coupled to said current source for selecting said two conductors in the same direction out of said plural conductors and supplying said two currents to the selected two conductors; and a scanning means for controlling said current source and for giving address data for selecting said two conductors to said selection means, said two currents applied to said two conductors being so controlled as to be in a predetermined relation to each other;
   a pickup means movably positioned on said interface plate for picking up two induced voltages induced by magnetic fields generated by said two currents flowing through said selected two conductors;
   a detection means coupled to said pickup means for detecting a predetermined relation between said two induced voltages; and
   a deriving means coupled to said control means and said detecting means for deriving current data and said address data when said detection means detects said predetermined relation between said two induced voltages, thereby to obtain a coordinate data corresponding to the position of said pickup means on said interface plate.

2. The apparatus as claimed in claim 1, wherein said predetermined relation between said two induced voltages is that the values of said two induced voltages are equal to each other and said predetermined relation between said two currents flowing through said two selected conductors is that the sum of the values of said two currents is constant.

3. The apparatus as claimed in claim 2, wherein at least one other conductor exists between said two selected conductors.

4. The apparatus as claimed in claim 3, wherein a constant bias current is superposed to each of said two currents flowing through each of said two selected conductors.

5. The apparatus as claimed in claim 1, wherein currents of the same frequency are alternatingly supplied to said selected two conductors on a time division basis.

6. The apparatus as claimed in claim 5, wherein said current source comprises a digital-to-analog converter which is applied alternatingly with a binary digital code and a complement of said digital code and produces time divided differential analog currents which are used as said currents of the same frequency.

7. The apparatus as claimed in claim 1, wherein currents of different frequencies are supplied at the same time to said selected two conductors.

8. The apparatus as claimed in claim 1, wherein said two induced voltages induced at said pickup means are compared with a predetermined threshold level, thereby to detect whether or not said pickup means is positioned between said selected two conductors.

9. The apparatus as claimed in claim 8, wherein the sum of the value of said two induced voltages is compared with said predetermined threshold level, thereby to detect whether or not said pickup means is positioned between said selected two conductors.

10. The apparatus as claimed in claim 1, wherein values of one of said two currents flowing through said selected conductors are checked whether or not they are within a specified area at plural positions of said pickup means on said interface plate, where the ratio of the values of said two induced voltages is equal to a predetermined value, thereby to detect the position of said pickup means.

* * * * *